US008723092B2

(12) United States Patent
Bartenbach

(10) Patent No.: US 8,723,092 B2
(45) Date of Patent: May 13, 2014

(54) LIGHT GUIDING DEVICE

(75) Inventor: Christian Bartenbach, Aldrans (AT)

(73) Assignee: Bartenbach Holding GmbH, Aldrans (AT)

( * ) Notice: Subject to any disclaimer, the term of this patent is extended or adjusted under 35 U.S.C. 154(b) by 239 days.

(21) Appl. No.: 13/387,435

(22) PCT Filed: Jul. 28, 2010

(86) PCT No.: PCT/EP2010/004627
§ 371 (c)(1),
(2), (4) Date: Jan. 27, 2012

(87) PCT Pub. No.: WO2011/012301
PCT Pub. Date: Feb. 3, 2011

(65) Prior Publication Data

US 2012/0126098 A1 May 24, 2012

(30) Foreign Application Priority Data

Jul. 31, 2009 (DE) ......................... 10 2009 035 451
Aug. 27, 2009 (DE) ......................... 10 2009 039 136

(51) Int. Cl.
*G02B 27/00* (2006.01)

(52) U.S. Cl.
USPC ........................................ 250/203.4; 359/596

(58) Field of Classification Search
USPC ............... 250/203.4; 126/592, 595, 640, 646, 126/692; 52/200
See application file for complete search history.

(56) References Cited

U.S. PATENT DOCUMENTS

| | | | | |
|---|---|---|---|---|
| 3,423,148 A | | 1/1969 | Reboul | |
| 3,709,583 A | * | 1/1973 | Pfannkuch et al. | 359/593 |
| 5,493,824 A | * | 2/1996 | Webster et al. | 52/200 |
| 5,675,487 A | * | 10/1997 | Patterson et al. | 700/56 |
| 7,352,509 B2 | * | 4/2008 | Pagel | 359/596 |
| 7,995,277 B2 | * | 8/2011 | Patterson | 359/591 |
| 2010/0294266 A1 | * | 11/2010 | Fung | 126/688 |

FOREIGN PATENT DOCUMENTS

| | | |
|---|---|---|
| DE | 19503293 | 8/1996 |
| DE | 19543812 | 5/1997 |
| DE | 19709546 | 9/1998 |
| DE | 10202830 | 8/2003 |
| DE | 202009001664 U1 | 6/2009 |
| JP | 06067079 | 3/1994 |
| WO | 2011012301 | 2/2011 |

OTHER PUBLICATIONS

Search Report, for related Priority Patent Application No. 102009039136.3.
International Search Report and Written Opinion dated Sep. 16, 2010, for related PCT Application No. PCT/EP2010/004627.

* cited by examiner

*Primary Examiner* — Tony Ko
(74) *Attorney, Agent, or Firm* — Troutman Sanders LLP; Ryan A. Schneider

(57) ABSTRACT

The present invention relates to a light guide device for the introduction of sunlight into the interior of a building, having a multitude of movably mounted light deflection surfaces which are adjustable by control means depending on the position of the sun. According to the present invention the light deflecting surfaces of the light guide device are formed by serially arranged deflecting blades which may be swiveled about swivel axes which are approximately parallel to each other, the blades being mounted on a blade holder which is rotatable about a rotational axis which is essentially perpendicular to the direction of the swivel axes.

18 Claims, 4 Drawing Sheets

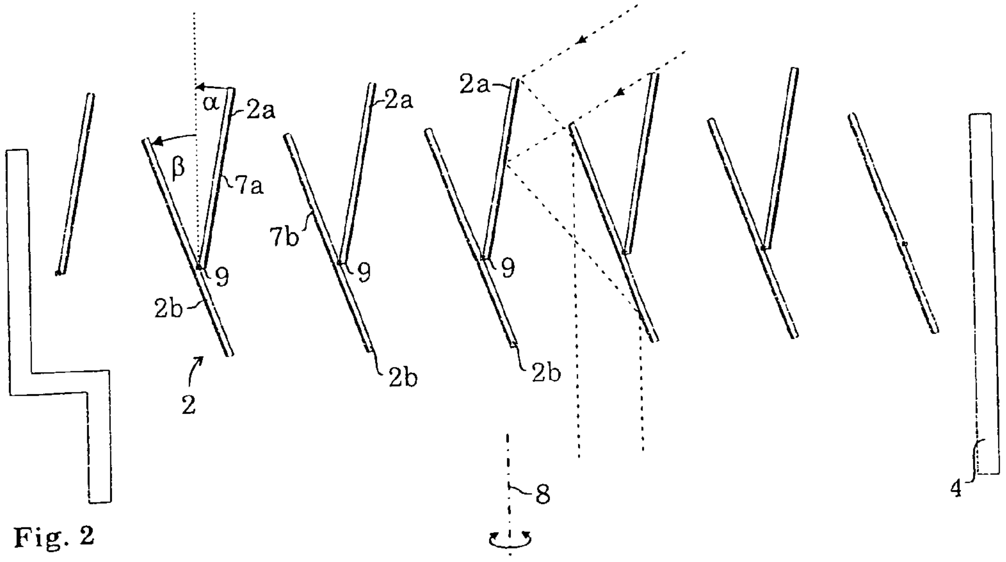
Fig. 2
Fig.3
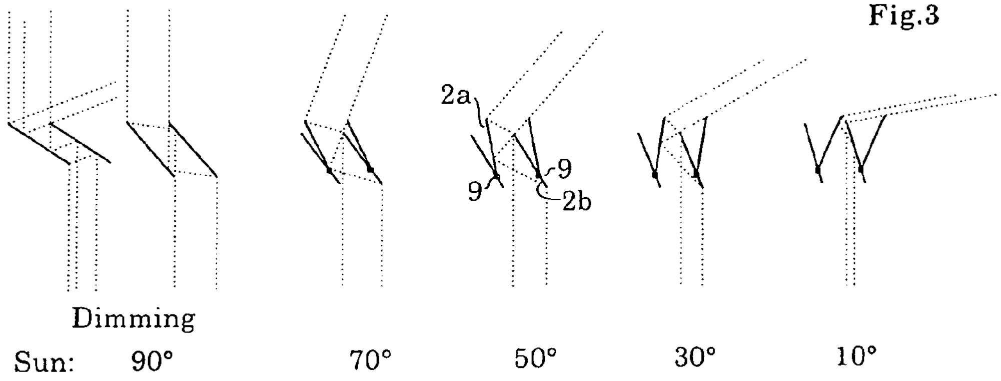

LIGHT GUIDING DEVICE

CROSS-REFERENCE TO RELATED APPLICATIONS

This application is a US National Stage of International Application No. PCT/EP2010/004627, filed 28 Jul. 2010, which claims the benefit of both DE 10 2009 035 451.4, filed 31 Jul. 2009, and DE 10 2009 039 136.3, filed 27 Aug. 2009, each herein fully incorporated by reference.

FIELD OF THE INVENTION

The present invention relates to a light guide device for the introduction of sunlight into the interior of a building, having a multitude of movably mounted light deflection surfaces which are adjustable by control means depending on the position of the sun.

BACKGROUND OF THE INVENTION

Due to the beneficial effects of natural daylight on human physiology and cognitive sensing architecture has been striving for some time to guide sunlight as deeply as possible into the interior of buildings in order to have a maximum of daylight even in rooms which are located in the interior side of a building and to require a minimum of artificial light.

In order to achieve introduction of sunlight into the interior of a building for example so called light tubes have been proposed which essentially consists of cylindrical tubes having mirrored internal walls for conducting daylight deeply into the interior of a building with minimal loss. However, efficiency of such light tubes depends on the position of the sun and will be especially compromised during evening hours or during early morning hours.

On the other hand heliostats have been proposed which by way of deflection surfaces deflect and occasionally even focus the daylight into the desired direction in order to conduct a strong bundle of light into the interior of the building. Such heliostat systems usually are very elaborate, spacious and costly. DE 101 29 745 A1 for example discloses a light guide device of the kind referred to above wherein sunlight is guided onto a second parabolic mirror which will conduct the deflected light into the interior of the building by way of a swivelable and rotatable first mirror. A Fresnel lens is interposed between them to focus the light in front of the parabolic mirror.

BRIEF SUMMARY OF THE INVENTION

Accordingly it is an object of the present invention to create an improved light guide device of the kind referred to above which does not suffer from prior art disadvantages and will suitably improve state of the art. Preferably efficient introduction of daylight deeply into the internal space of buildings is to be realized by way of a light guide device which preferably is easy to handle, maintenance-free and cost-effective.

According to the present invention this object will be achieved by way of a light guide device according to claim 1. Preferred embodiments of the present invention are disclosed in the dependent claims.

It will thus be proposed to conduct the sunlight into the interior of the building by way of a compact non-bulky lightweight lamellar arrangement. According to the present invention the light deflecting surfaces of the light guide device are formed by serially arranged deflecting blades which are swivelable about swivel axes which are approximately parallel to each other, the blades being mounted on a blade holder which is rotatable about a rotational axis which is essentially perpendicular to the direction of the swivel axes. Advantageously the light guide device may accomplish guiding of the light into the building solely by way of the blades and may omit prior art spacious mirrors spaced apart from each other which are known from conventional heliostats, thus obtaining dimensional shortness. Especially, the light guide device may essentially consists of only one holder ring and the deflecting blades which approximately are located in a cross-sectional plane of the holder ring, in order to achieve the desired shortness of dimension. Besides the main components holder ring and deflecting blades additional components may be present such as drive gears and control elements completing the light guide device. Occasionally additional deflection blades and/or other deflection means may be added to dissipate the beam of sunlight guided by the light guide device into the interior of the building into different parts of the building. Parallel arrangement of the swivel axes of the blades enables simple and easy to handle actuation. Furthermore the blades are easy to manufacture and almost maintenance-free. The deflecting blades may advantageously be comprised of longitudinal deflection slats the surfaces of which are at least mirrored on one side thereof.

In another aspect of the invention said blade holder may be formed by an annular light guide tube portion through which the light deflected by the deflecting blades is passed. Advantageously the deflecting blades are arranged on one portion of the light tube in order to introduce the daylight into the light guide tube advantageously parallel to the longitudinal direction thereof.

In order to enable adapting of the deflecting blades to the position of the sun while resting on the annular light guide tube portion said annular light guide tube portion, according to one aspect of the invention, is rotatable about its central axis, the rotation suitably being controlled by a suitable motor-driven actuator which is controlled by control means which are mentioned above. The light guide tube portion may for example be rotated by a pinion or friction wheel drive which circumferentially or frontally engages the light guide tube portion.

The deflecting blades are advantageously arranged at a front end portion inside the light guide tube. The deflecting blades are advantageously arranged within the contour of the light guide tube portion. Advantageously the deflecting blades are rotatably mounted on the wall of said light guide tube portion. The wall of the light guide tube portion may have bearing points whereon the deflecting blades are mounted about said approximately parallel swivel axes. The circumferential wall of the light guide tube portion may for example preferentially have bore hole-shaped recesses for mounting of portions of the swivel axis, whereby other swivel bearings may also be provided. The deflecting blades which are parallel to their swivel axes advantageously extend essentially across the entire transversal extension of the annular light guide tube portion wherein the deflecting blades have different lengths, depending on the position in the light guide tube portion. The length of the deflecting blades matches the circumferential contour of the light guide tube portion and the respective position of the deflecting blade.

The deflecting blades are adapted to the position of the sun by the control means by way of actuators, i.e. at least one actuator for each of the swivel position of the deflecting blades and the rotational position of the blade holder will be provided, advantageously such that the deflected light is constantly passed through the light guide tube portion parallel to the longitudinal axis. In this way maximal introduction of daylight deeply into the interior of buildings may be achieved.

Basically the deflecting blades may have different shapes. According to an advantageous embodiment of the invention the deflecting blades are combined in pairs such that a first blade of a pair of blades captures the daylight or the sunlight, respectively, guiding it to the second blade of the pair of blades. Said second blade will then guide the daylight or the sunlight, respectively, coming from the first blade into the desired direction into the interior of the building, and especially parallel to the longitudinal axis of the light guide portion of the tube and/or vertically downward into the interior of the building.

Said first and second blades are advantageously positioned opposite to each other across the entire arrangement of blades, with the first and second blade of a respective pair of blades being formed as mirrors or having minor coatings, respectively, on those sides or surfaces, respectively, which face each other.

In order to constantly achieve maximal light deflection and introduction into the interior of the building for different positions of the sun said first and second blades of a respective pair of blade are on the one hand displaceable into different tilt angles and on the other hand are also displaceable into different tilt angles in relation to the blade holder, i.e. the blades of a pair of blade may be modified in their tilt angle, i.e. the blades of a pair of blade may be displaced in relation to each other by modifying their tilt angle and additionally may—collectively or individually—be swiveled in relation to the blade holder.

As to the control means they are especially formed such that said first and second blades of a pair of blade will become more or less expanded depending on the elevation of the sun. Simultaneously orientation of both blades may be modified in relation to the blade holder depending on the position of the sun. An advantageous aspect of the invention resides in that, the sun being in its zenith, the first and second blades of a pair of blade are arranged approximately parallel to each other and/or the first and second blades of a pair of blade will be positioned in a spreading angle becoming increasingly larger as the sun will continue to descend, i.e. they will be arranged according to a V becoming increasingly obtuse.

In another aspect of the invention, in order to achieve a non-bulky and light-weighed blade arrangement, two blades are co-mounted and/or are mounted by way of a blade holder, the co-mounting being advantageously realized such that one blade may be swiveled in relation to the other blade to enable modification of the tilt angle of the blades in relation to each other.

In an advantageous aspect of the invention an arrangement of the blades is provided wherein two cooperating blades are swivelly mounted about separate swivel axes spaced apart from each other. In the sense as set forth above the expression "cooperating" means that a first blade captures the light and will subsequently transmit the light onto a second blade which deflects the light coming from the first blade into the desired direction.

In order to nevertheless obtain a non-bulky and compact arrangement two deflecting blades not cooperating as set forth above may nevertheless be combined for mounting or may swivelly be mounted about a shared axis, respectively. It may especially be provided that the blades may be combined for mounting such that the first blade of a first pair of blades is swivelly mounted on the second blade of a second pair of blades. The two blades mounted to each other thus do not form a pair of blade in the sense as set forth above in that said one blade will capture the sunlight, guiding it to the other blade. Said one blade which is mounted on top of said other blade or is co-seated with the latter in one swivel bearing respectively, will rather guide the captured light to the backing of a third blade carrying another capturing blade.

The blades may basically be differently formed; they may for example have a groove-shaped contour. According to an advantageous aspect of the invention the blades may be formed as planes. By appropriate angle controlling effective light deflection may be achieved with blades which are easy to manufacture.

Basically all blades, as seen in a sectional view, may have the same contour and/or size. According to one advantageous aspect of the invention there may be blades of different cross-sectional sizes especially if the blades as set forth above are combined pairwise and are attached to each other, respectively. Especially the first blade mentioned above which captures the sunlight for guiding it to the second blade may have a cross-sectional extension lower than that of the above mentioned second blade of a respective pair of blade. The width of the blade is in the range of approximately 30% to 90%, preferably in the range of approximately 50% to 75% of the width of a related second blade.

Controlling of the tilt angles of the deflecting blades may basically be realized in different ways. According to an advantageous embodiment of the invention the blade control may be affected by time control. Control means comprise a timer for example in the form of a clock calculating the blade control by way of clock time and/or may read the time from a table to generate respective control signals for actuators. If the position of the light guide device is known optimal positioning may be calculated from the clock time.

Alternatively or additionally tilting of the deflecting blade may also be controlled by sensors. According to another advantageous embodiment of the invention the control means may have a detection device, preferably comprising brightness sensors for the detection of the position of the sun in relation to the blade holder. By way of recording the position of the sun an appropriate controller controls the angular position of the deflection blade in relation to the blade holder as well as the angular position of the blade holder in relation to the rotational axis thereof. A sensor controlled tilting of the deflecting blade has the advantage that irrespective of the installation site of the light guide device, i.e. irrespective of the degree of latitude and longitude different programming of the control is not required, such as would be the case with a time control if the light guide device would be installed once in Tokyo and once in Rio de Janeiro. Moreover the common problems of a time control such as incorrect timer or time delay due to power failure will be avoided. A timer may completely be omitted.

In an advantageous aspect of the invention the sensor control may comprise two brightness sensors, specifically relative brightness sensors, one of which will be employed for controlling rotation of the blade holder about the vertical axis and the other will be employed for controlling the blades about their swivel axes. Advantageously a first brightness sensor may be provided on the blade holder and/or may be provided non-rotatably about the rotational axis thereof, such that this light sensor during rotation of the blade holder about the rotational axis thereof will be sun-oriented better or worse, depending on the rotational position, so that from the signal of this first brightness sensor the rotational position of the blade holder may be set. The second brightness sensor may advantageously be swivelly arranged about a swivel axis, which is always parallel to the swivel axis of the blades, wherein the transmission ratio of the swivel position of this second brightness sensor to the swivel position of the blades will suitably be high. Swiveling of the brightness sensor twice as fast or twice as far, respectively, may be of particular benefit. In any case a constant ratio of swivel angle is provided between this second brightness sensor and the swivel angle of the blades. In any case the swivel position of the blades will be set according to the signal of the second brightness sensor.

Advantageously the rotational position of the blade holder will be adapted to the position of the sun such that the deflecting blades which are mounted on the blade holder are oriented having their swivel axes perpendicular to the direction of the incident sun light.

The swivel angle of the blades may advantageously be set by a shared blade drive simultaneously swiveling both the first blades mentioned above and the second blades. As the first and second blades advantageously are swiveled in a fixed angular ratio to each other swiveling of the blades wherein each blade is to be swiveled to a different extent may be actuated by the same swivel drive. This may for example be accomplish by suitably selecting the transmission stage(s) and/or reduction stage(s) which are effective in one of the drive trains extending from the shared swivel drive to the first blades on the one hand and to the second blades on the other hand.

In order to capture a maximum amount of sunlight even if the position of the sun is low an arrangement of the blades might be of advantage wherein the blades which are located towards the rear will be arranged in a higher position than those which are located towards the front. For this the blade holder may be provided in a position wherein it may be tilted parallel to the swivel axes of the blades about another swivel axis for tilting the overall arrangement of blades as desired. Alternatively it may be provided that the blades which are located toward the rear would for example be height-adjustably mounted in a slot guide on the blade holder. According to a simple embodiment of the device arrangement of the blades in a fixed plane might be sufficient wherein the plane may for example be horizontally oriented.

BRIEF DESCRIPTION OF THE DRAWINGS

The invention will be illustrated in details below by way of a preferred embodiment and accompanying drawings wherein:

FIG. 2: shows a schematic sectional view of the light guide device of FIG. 1 illustrating the arrangement of the deflecting blades in the interior of the light guide tube portion the different drawings showing different angular positions of the deflecting blades, FIG. 3: shows a schematic representation of the different angular positions of the deflecting blades for different positions of the sun.

DETAILED DESCRIPTION OF PREFERRED EMBODIMENTS

Figure 1:
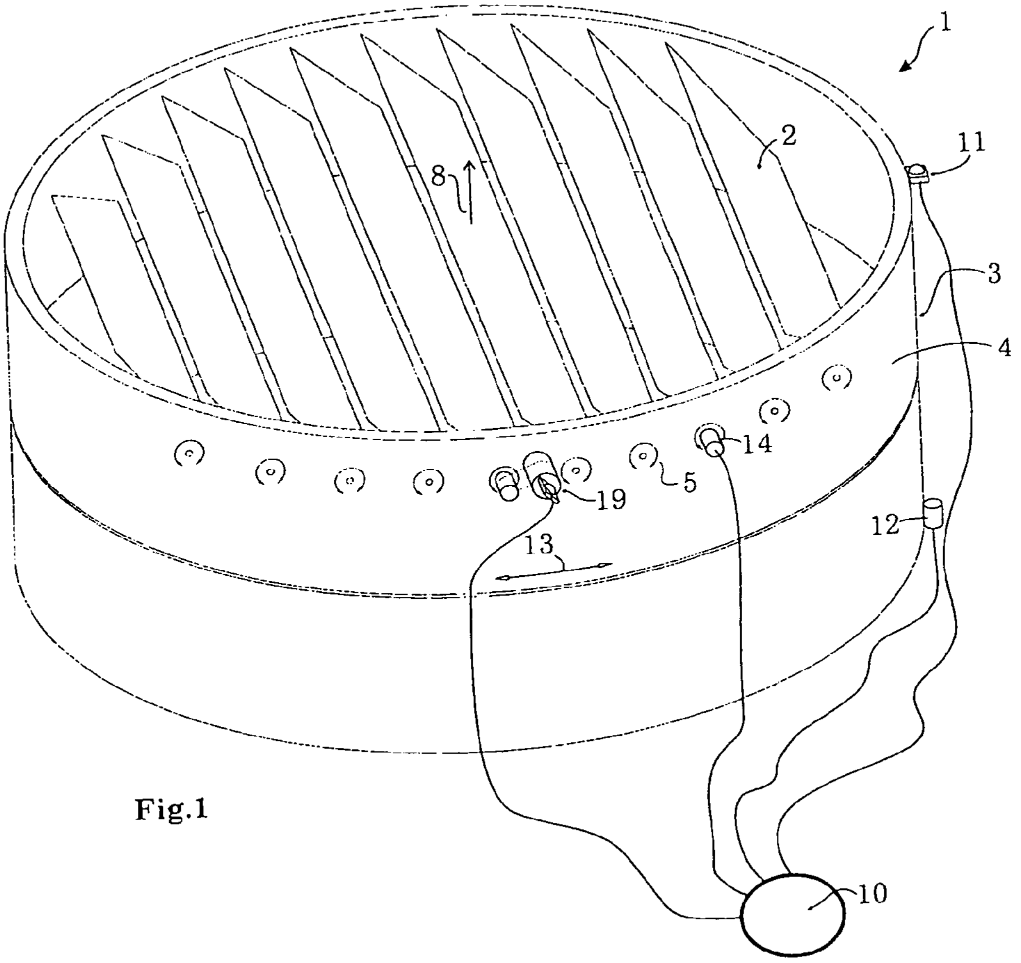
FIG. 1: shows a schematic perspective view of light guide device according to an advantageous embodiment of the invention comprising an approximately cylindrical light guide tube portion wherein the deflecting blades are swivelly mounted.

The light guide device 1 shown in FIG. 1 comprises an essentially cylindrical light guide tube portion 4 which may for example be located at the bottom of a light well or a light guide tube in order to guide the light into the interior of the building.

Figure 6:
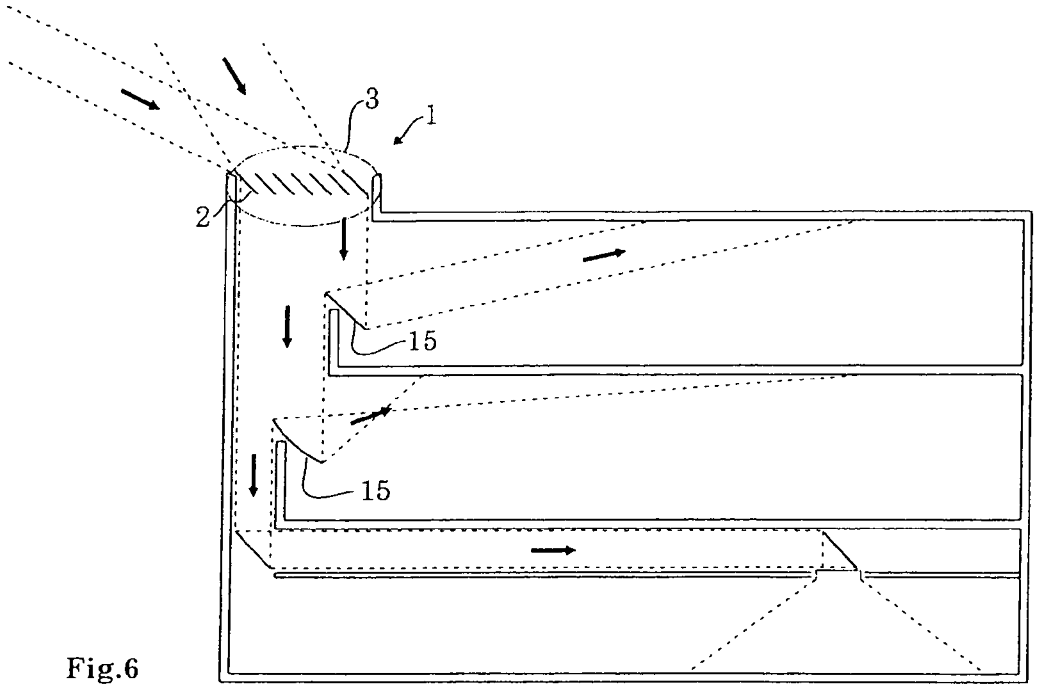
FIG. 6: shows a schematic representation of distribution and deflection of light in the interior of a building downstream of the light guide device which is mounted on top of the roof of the building, in the embodiment as shown.

As it is shown in FIG. 6 the light guide device may be installed on top of the roof of a building. By the deflection of the captured sunlight by way of deflecting blades which are arranged in a parallel focused and in the downward direction essentially vertically aligned beam of sunlight significant advantages will arise in comparison to a conventional light tube. On the one hand efficiency will significantly increase, i.e. a much greater amount of light will reach the ground of the building in comparison to a conventional light tube as the number of reflections will significantly be reduced on the way down. While, with a conventional light tube, a multitude of reflections will arise on the walls until the light will reach the lower floors of the building, especially when the position of the sun is lower, the present light guide device only requires two reflections on the blade area as the light during its way down will not require additional deflections due to the parallel and vertical alignment of the sunbeams during their way further down.

On the other hand a continuous light tube which may occasionally pass through several floors occupying appropriate space may be omitted. Incorporation of transparent areas into ceilings and floors may be sufficient since parallel deflected beams of sunlight will reach the bottom although a continuous light tube is not present.

As shown in FIG. 6 this allows for very simple and easy branching off different parts of the deflected sunlight beam in different areas. For example a deflecting blade 15 may be arranged on each floor in the range of the sunlight beam which is deflected into the building in order to branch off only part of this deflected beam of sunlight into each floor, preferably to reflect it onto the ceiling of a respective floor, cf. FIG. 6. Moreover it is made possible to horizontally deflect the sunlight beam guided into the building and/or to deflect it onto a path having a horizontal component in order to introduce the light into the desired lower floor parts laterally offset to the deflection device positioned on top of the roof, cf. FIG. 6.

The light guide tube portion 4 mentioned above on the top of the light well forms a blade holder 3, wherein a variety of deflecting blades 2 are mounted. As shown in FIG. 1 said deflecting blades 2 are positioned within the contours of the light guide tube portion 4, more specifically on the front end of the light guide tube portion 4 in the interior thereof.

The deflecting blades 2 extend along parallel axes which are arranged in a plane transversely to the longitudinal direction of the light guide tube portion 4. The deflecting blades 2 each extend transversely across the entire transversal extension of the light guide tube portion 4 so that the interior space is completely covered with deflecting blades 2.

The deflecting blades 2 are swivelly mounted about swivel axes 9 on the light guide tube portion 4; said swivel axes 9 extending parallel to the longitudinal axis of the respective deflecting blades 2. As set forth in FIG. 1 the deflecting blades 2 may be mounted on the wall of the light guide tube portion 4, the wall having appropriate swivel bearing portions 5.

Said light guide tube portion 4 in turn is swivelable or rotatable, respectively, i.e. about a rotational axis 8 corresponding essentially to the centrally located longitudinal axis of the light guide tube portion 4. An appropriate actuator 12 may rotate the light guide tube portion 4, as indicated by the arrow 13. Similarly actuators 14 are associated to the deflecting blades 2 in order to swivel the deflecting blades 2 in relation to blade holder 3.

Figure 4:
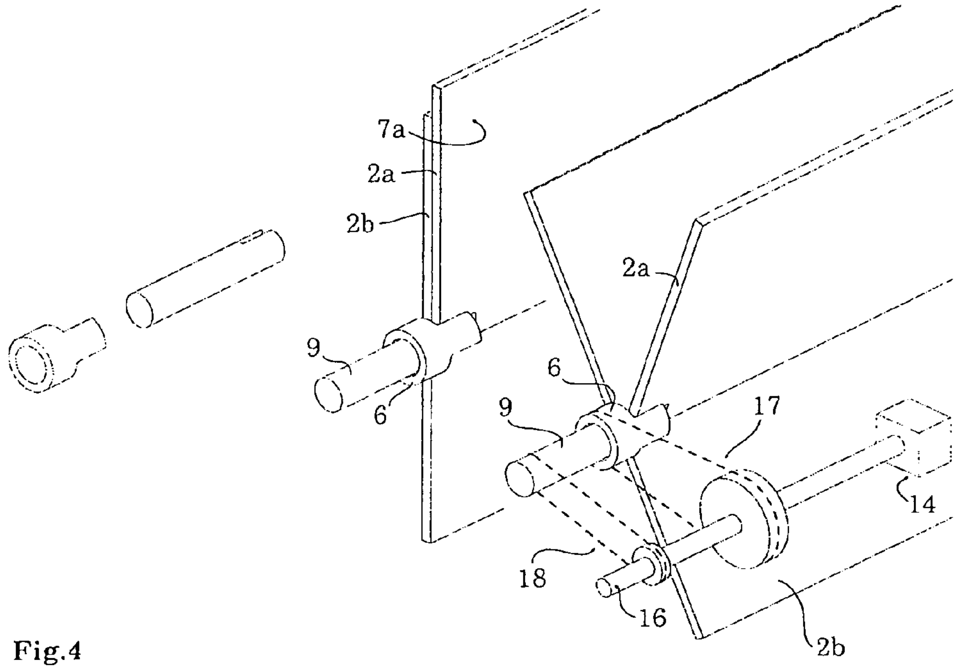
FIG. 4: shows an enlarged and perspective representation in part of the mounting of two blades in relation to each other showing the swivel capability of the blades in relation to each other.

As shown in FIG. 4 two deflecting blades 2 are mounted to each other or co-mounted on a swivel axis 9, respectively, such that the two blades may be swiveled while forming a fixed tilt angle in the space with respect to each other, i.e. they may be swiveled in relation to the light guide tube portion 4 and on the other hand, at the same time, the two blades may also be swiveled in relation to each other such that for example only one of the blades is swiveled in relation to the light guide tube portion 4. As shown in FIG. 4 this may easily be achieved by seating one of the blades onto swivel axis 9 which by way of a bearing eye 6 is firmly attached to the other blade.

FIG. 2 shows the arrangement of the der deflecting blades 2 in a sectional view wherein it is clear that the deflecting blades 2 each are combined in pairs. A first blade 2*a* which is provided for capturing sunlight protrudes a second blade 2*b* cooperating therewith. Said first blade 2*a* has a mirrored surface 7*a* facing the sunlight while the second blade 2*b* has a mirrored surface 7*b* facing away from the sun but facing the first blade 2*a*.

As shown in FIG. 2 the first blade 2*a* of each pair of blades will be tilted about an angle $\alpha$ in relation to the vertical line while the second blade 2*b* is tilted about an angle $\beta$ in relation to the vertical line. This angular setting of the first and second blades is made depending on the position of the sun, i.e. of the solar elevation angle, as it is exemplified in FIG. 3 and in FIG. 5. When the sun is at its zenith both the first and second blade 2*a* and 2*b* cooperating with each other are aligned parallel to each other and will be tilted in relation the vertical line about the same angle. This angle may basically be altered in order to accomplish dimming as it is set forth in FIG. 3 by way of the two representations of the 0° angle of incidence. If the two blades 2*a* and 2*b* will strongly be tilted (in a parallel position to each other), such that the first blade 2*a* will reflect part of the captured sunlight back to the environment while skipping the second blade 2*b* only part of the available light will reach the interior space. The position on the right however illustrates complete introduction of the sunlight into the interior space.

The lower the position of the sun the stronger the two cooperating blades 2*a* and 2*b* will expand out of the parallel position in relation to each other in the form of a V, i.e. they are tilted about different tilt angles $\beta$ and $\alpha$. Advantageously for each of the tilt angles $\alpha$ and $\beta$ a linear relationship with the solar elevation angle may be provided, but each having different slope of the course, cf. FIG. 5.

Figure 5:
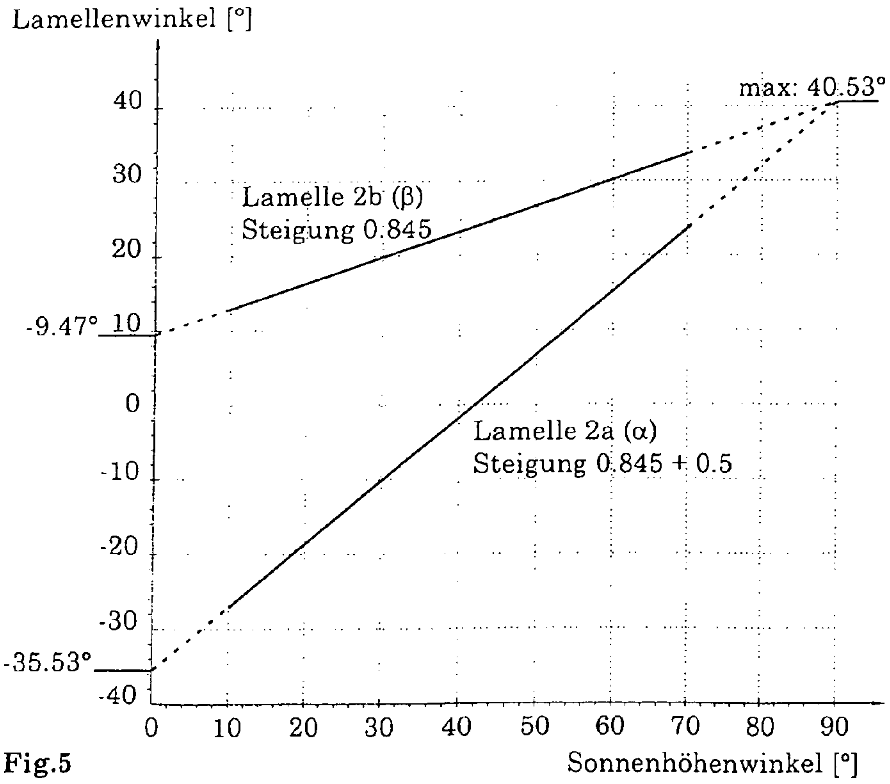
FIG. 5: shows a graphical representation of the relationship between the tilt angle of the blades and the angle of the height of the sun.

As set forth in FIG. 5 and FIG. 3 the first blade capturing the sunlight will advantageously be adjusted the more the lower the sun will descend.

The linear relationship shown in FIG. 5 of the tilt angles $\alpha$ and $\beta$ advantageously allows actuating the blades 2*a* and 2*b* which are to be adjusted to a greater or lesser extent, by a shared actuator 14 despite different amount of adjustment, as shown in FIG. 4. As it is shown in FIG. 4 this for example may be accomplished in that between the drive shaft 16 of actuators 14 and the swivel axis of the first blade 2*a* a first transmission step 17 having a different transmission and reduction ratio respectively than the second transmission step 18 between said drive shaft 16 and the swivel axis of the second blade 2*b* is provided. The transmission ratios of both of the transmission steps 17 and 18 are herein selected such that the expansion shown in FIG. 5 of the tilt angles $\alpha$ and $\beta$ in relation to each other will occur.

Advantageously the blade holder 3 also will completely be rotated about the rotational axis 8 depending on the position of the sun, preferably such that the blades 2 including their swivel axes 9 will always be in vertical orientation to the direction of incident light.

Advantageously the control means 10 may automatically modify the orientation of the blade depending on the position of the sun.

If the position of the device on earth is known the position of the sun may be calculated depending on the respective time and optimal orientation of the deflecting blades 2 may also be determined accordingly. According to an advantageous embodiment of the invention the control means may control the actuators 12 and 14 on a time dependant basis. Knowing the installation site the appropriate processor control may calculate the tilt angles time-dependently or may read them from a table, respectively.

Alternatively sensor regulation of the position of the deflecting blades may be provided. As shown in FIG. 1 the position of the sun in relation to the light guide device may be recorded by way of light and/or brightness sensors 11 and 19. Based on the recorded position of the sun tilting of the deflecting blades 2 may be regulated by a regulator of the control means 10. Advantageously a first brightness sensor 11 is firmly attached to the blade holder 3 and/or to the rotational axis thereof such that the brightness sensor 11 co-rotates with the blade holder 3. Advantageously said brightness sensor is a differential brightness sensor. Such a differential brightness sensor has two sensor elements which do not measure the same brightness until the sensor is oriented toward a specific direction. For this for example the main measuring directions of the two sensor elements may be tilted in relation to each other. If the blade holder 3 will be rotated back and forth thus additionally orientating the brightness sensor 11 toward the sun from the left or from the right side, the initial signals of both halves of the brightness sensor or of both sensor elements, respectively will thus oppositely increase or decrease, from which optimal orientation of the blade holder 3 may be determined and the position thereof where both sides of the sensor are equally orientated toward the sun may accordingly be set. Furthermore at least a second brightness sensor 19 will advantageously be provided which is swivelly arranged about a swivel axis extending parallel to the swivel axis of the blades. By way of this second brightness sensor 19 elevation of the solar position will be registered, the swiveling movement of the brightness sensor 19 advantageously being coupled to the swiveling movement of the blade in a predetermined ratio. If this brightness sensor 19 will be swiveled up and down orientation thereof in relation to the solar elevation which will be made as mentioned above will sometimes be better and sometimes be worse such that its initial signal will increase or decrease according to the swivel position. From this optimal orientation in relation to the sun may also be determined and the swivel position of the blades may accordingly be set.

If tilting of the deflecting blades is sensor controlled or regulated a timer may entirely be omitted such that time deviations such as for example due to power failure or wrong clock time are negligible. Furthermore the control does not require specific programming depending on the installation site.

The invention claimed is:

1. A light guide device for the introduction of daylight and/or sunlight into the interior of a building having a multitude of movably mounted light deflection surfaces that are adjustable by control means depending on the position of the sun, wherein the light deflection surfaces are formed by serially arranged deflecting blades that may be swiveled about swivel axes that are approximately parallel to each other, the blades being mounted on a blade holder formed by an annular light guide tube portion having a longitudinal axis, the blade holder rotatable about a rotational axis that is essentially perpendicular to the direction of the swivel axes;

and wherein the deflecting blades are combined in pairs each having a first and second deflecting blade, wherein a first blade of a pair of first and second blades captures daylight or sunlight respectively guiding it to a second blade of the pair of first and second blades, which will deflect the light coming from the first blade parallel to the longitudinal axis of the light guide tube portion.

2. The light guide device according to claim 1, wherein the light guide tube portion can be swiveled about a central axis thereof and through which the light deflected by the deflecting blades can be conducted into the interior of the building.

3. The light guide device according to claim 1, wherein the deflecting blades are arranged in the interior and/or within the contour of the light guide tube portion at a front end portion of the light guide tube portion and are rotatably mounted on a wall of the light guide tube portion.

4. The light guide device according to claim 1, wherein the deflecting blades are adaptable to the position of the sun by the control means such that the deflected light is constantly passed through the light guide tube portion parallel to the longitudinal axis thereof.

5. The light guide device according to claim 1, wherein the first and second blades can be brought into different tilt angles in relation to each other and can be brought into different tilt angles in relation to the blade holder.

6. The light guide device according to claim 5, wherein the first and second blades can be modified in their tilt angle in relation to each other depending on the solar elevation.

7. The light guide device according to claim 1, wherein the first and second blades of a cooperating pair of blades—the first blade thereof capturing the sunlight and the second blade thereof receiving the light deflected by the first blade and in turn deflecting it—are swivelly mounted about spaced apart swivel axes, wherein the first blade of a first pair of cooperating blades is swivelly mounted on the second blade of a second pair of cooperating blades and/or the second blade of the second pair of cooperating blades is swivelly mounted on the first blade of the first pair of cooperating blades and/or the first blade of the first pair of cooperating blades and the second blade of the second pair of cooperating blades is swivelly co-mounted on a shared swivel bearing.

8. The light guide device according to claim 1, wherein the deflecting blades comprise planar plate-shaped deflecting bodies.

9. The light guide device according claim 1, wherein the first blades are formed narrower than the second blades of a respective pair of blades.

10. The light guide device according to claim 1, wherein the blades that are more distant from the sun are arranged in a higher position than blades that are closer to the sun and/or the blade holder is tiltably mounted about a lying tilt axis parallel to the swivel axis of the blades such that blades that are more distant from the sun can be positioned in a higher position than the blades that are positioned closer to the sun.

11. The light guide device according to claim 1, wherein the control means further provides for tilting of the blade holder depending on the solar elevation such that when the position of the sun is lower, the blades that are more distant from the sun will be put into a higher position than the blades that are positioned closer to the sun.

12. The light guide device according to claim 1, wherein the first and second deflecting blades each are adjusted according to a linear dependence on the solar elevation angle, wherein the linear dependence of the tilt angle of the respective first blades is different from the linear dependence of the second blade on the solar elevation angle.

13. The light guide device according to claim 1, wherein the control means comprises a timer as well as a control element for controlling of the swivel position of the deflecting blades and of the rotational position of the blade holder depending on a signal of the timer.

14. The light guide device according to claim 1, wherein the control means comprise recording means comprising brightness sensors and a control element for controlling of the swivel position of the deflecting blades and of the rotational position of the blade holder depending on the recorded position of the sun.

15. The light guide device according to claim 1, wherein the deflecting blades are combined with each other and positioned such that all light guided into the interior of the building is deflected by the blades and no undeflected light may pass into the building's interior.

16. The light guide device according to claim 1, wherein the deflecting blades are all arranged in a horizontal plane and/or the holder is horizontally arranged.

17. A light guide device for the introduction of daylight and/or sunlight into the interior of a building having a multitude of movably mounted light deflection surfaces that are adjustable by control means depending on the position of the sun, wherein the light deflection surfaces are formed by serially arranged deflecting blades that may be swiveled about swivel axes which are approximately parallel to each other, the blades being mounted on a holder that is rotatable about a rotational axis that is essentially perpendicular to the direction of the swivel axes, wherein the deflecting blades are combined in pairs, wherein a first blade of a pair of blades captures daylight or sunlight respectively guiding it to the second blade of the pair of blades, which will deflect the light coming from the first blade parallel to the longitudinal axis of the light guide tube portion, wherein depending on the solar elevation, the first and second blades are brought into different tilt angles in relation to each other as well as into different tilt angles in relation to the blade holder such that the first and second blades define a spreading angle between them becoming increasingly larger as the sun continues to go down.

18. A light guide device for the introduction of daylight and/or sunlight into the interior of a building having a multitude of movably mounted light deflection surfaces that are adjustable by control means depending on the position of the sun, wherein the light deflection surfaces are formed by serially arranged deflecting blades that may be swiveled about swivel axes that are approximately parallel to each other, the blades being mounted on a holder that is rotatable about a rotational axis that is essentially perpendicular to the direction of the swivel axes, wherein the deflecting blades are combined in pairs, wherein a first blade of a pair of blades captures daylight or sunlight respectively guiding it to the second blade of the pair of blades, which will deflect the light coming from the first blade parallel to the longitudinal axis of the light guide tube portion, wherein the first and second deflecting blades each are adjusted according to a linear dependence on the solar elevation angle, wherein the linear dependence of the tilt angle of the respective first blades is different from the linear dependence of the second blade on the solar elevation angle.

* * * * *